US009334937B2

(12) United States Patent
Schroeder et al.

(10) Patent No.: US 9,334,937 B2
(45) Date of Patent: May 10, 2016

(54) FLOATING NUT AND CARRIAGE ASSEMBLY

(71) Applicants: Robert Schroeder, Machesney Park, IL (US); Jonathan R. Schroeder, Machesney Park, IL (US); Joseph A. Binka, Belvidere, IL (US); Paul D. Ross, Rockford, IL (US)

(72) Inventors: Robert Schroeder, Machesney Park, IL (US); Jonathan R. Schroeder, Machesney Park, IL (US); Joseph A. Binka, Belvidere, IL (US); Paul D. Ross, Rockford, IL (US)

(73) Assignee: Pacific Bearing Company, Rockford, IL (US)

( * ) Notice: Subject to any disclaimer, the term of this patent is extended or adjusted under 35 U.S.C. 154(b) by 295 days.

(21) Appl. No.: 13/934,423

(22) Filed: Jul. 3, 2013

(65) Prior Publication Data
US 2015/0007676 A1    Jan. 8, 2015

(51) Int. Cl.
*F16H 25/24* (2006.01)

(52) U.S. Cl.
CPC ........ *F16H 25/24* (2013.01); *F16H 2025/2445* (2013.01); *Y10T 74/18648* (2015.01)

(58) Field of Classification Search
CPC ............ F16H 25/24; F16H 2025/2445; F16H 25/2454; F16H 2025/2034; F16H 25/20; F16H 25/04; F16H 2025/04; F16C 17/04; F16C 17/08; F16C 29/063; F16C 29/005; F16C 29/0633; F16C 35/10; B23Q 1/58
See application file for complete search history.

(56) References Cited

U.S. PATENT DOCUMENTS

| 2,228,244 A | 1/1941 | Baker |
| 2,348,611 A | 5/1944 | Davidson |
| 3,359,792 A | 12/1967 | Lukens |
| 3,656,358 A | 4/1972 | Kopp |
| 3,713,932 A | 1/1973 | Butzow et al. |
| 4,131,031 A | 12/1978 | Erikson et al. |
| 4,210,033 A | 7/1980 | Erikson et al. |
| 4,249,426 A | 2/1981 | Erikson et al. |
| 4,274,294 A | 6/1981 | Siryj et al. |
| 4,282,764 A | 8/1981 | Harris |

(Continued)

FOREIGN PATENT DOCUMENTS

| GB | 2 408 301 A | 5/2005 |
| JP | 61228157 A | 10/1986 |

(Continued)

OTHER PUBLICATIONS

U.S. Appl. No. 61/579,699, filed Dec. 23, 2011, Schroeder et al.

(Continued)

*Primary Examiner* — William Kelleher
*Assistant Examiner* — Jude Agendia
(74) *Attorney, Agent, or Firm* — Reinhart Boerner Van Deuren P.C.

(57) ABSTRACT

A linear guide including a guide rail, a carriage, a drive screw and a connection arrangement is provided. The guide rail defines a linear travel path. The carriage is mounted to the guide rail for motion along the linear travel path. The drive screw is operably mounted to the guide rail. The connection arrangement couples the drive screw to the carriage to convert rotary motion of the drive screw to linear actuation of the carriage along the linear travel path. The connection arrangement provides a single degree of linear freedom between the drive screw and the carriage in a direction that is generally perpendicular to the linear travel path. The single degree of linear freedom permits relative motion between the screw and the carriage to relieve internal binding between the relative components.

18 Claims, 8 Drawing Sheets

(56) References Cited

U.S. PATENT DOCUMENTS

| | | | |
|---|---|---|---|
| RE32,433 E | 6/1987 | Erikson et al. | |
| 4,954,032 A | 9/1990 | Morales | |
| 5,027,671 A | 7/1991 | Erikson et al. | |
| 5,303,606 A | 4/1994 | Kokinda | |
| 5,601,372 A | 2/1997 | Erikson et al. | |
| 5,732,596 A | 3/1998 | Erikson et al. | |
| 5,913,940 A | 6/1999 | Erikson et al. | |
| 5,913,941 A | 6/1999 | Erikson et al. | |
| 5,937,702 A | 8/1999 | Erikson et al. | |
| 6,000,292 A * | 12/1999 | Nagai et al. | 74/89.33 |
| 6,041,671 A | 3/2000 | Erikson et al. | |
| 6,099,166 A | 8/2000 | Erikson et al. | |
| 6,117,249 A | 9/2000 | Erikson et al. | |
| 6,131,478 A | 10/2000 | Erikson et al. | |
| 6,202,500 B1 | 3/2001 | Erikson et al. | |
| 6,240,798 B1 | 6/2001 | Erikson et al. | |
| 6,346,788 B1 * | 2/2002 | Nagai et al. | 318/432 |
| 6,415,673 B1 | 7/2002 | Erikson et al. | |
| 6,422,101 B2 | 7/2002 | Erikson et al. | |
| 6,467,362 B2 | 10/2002 | Erikson et al. | |
| 6,588,289 B2 * | 7/2003 | Ung et al. | 74/89.4 |
| 6,619,846 B1 * | 9/2003 | Nagai et al. | 384/45 |
| 6,880,417 B2 | 4/2005 | Nagai et al. | |
| 7,219,570 B2 | 5/2007 | Erikson et al. | |
| 7,506,557 B2 | 3/2009 | Hosokai et al. | |
| 7,552,657 B2 | 6/2009 | Erikson et al. | |
| 7,891,265 B2 | 2/2011 | Erikson et al. | |
| 7,992,456 B2 | 8/2011 | Schroeder et al. | |
| 8,028,594 B2 | 10/2011 | Schroeder | |
| 9,010,205 B2 * | 4/2015 | Schroeder et al. | 74/89.32 |
| 2001/0015581 A1 | 8/2001 | Sato et al. | |
| 2004/0093971 A1 | 5/2004 | Fujibayashi | |
| 2007/0295128 A1 | 12/2007 | Erikson et al. | |
| 2008/0119294 A1 | 5/2008 | Erikson et al. | |
| 2008/0193063 A1 | 8/2008 | Chen et al. | |
| 2008/0292226 A1 | 11/2008 | Chen et al. | |
| 2009/0140586 A1 * | 6/2009 | Fukano et al. | 310/83 |
| 2009/0249910 A1 | 10/2009 | Erikson et al. | |
| 2010/0139426 A1 * | 6/2010 | Mori et al. | 74/89.32 |
| 2010/0177996 A1 | 7/2010 | Menges et al. | |
| 2012/0186374 A1 | 7/2012 | Schroeder et al. | |
| 2012/0213457 A1 | 8/2012 | Schroeder | |
| 2013/0160585 A1 | 6/2013 | Schroeder et al. | |

FOREIGN PATENT DOCUMENTS

| | | |
|---|---|---|
| JP | 2001-221313 A | 8/2001 |
| JP | 2001-280440 A | 10/2001 |
| JP | 2003-240098 A | 8/2003 |
| WO | WO 2006/106817 A1 | 10/2006 |

OTHER PUBLICATIONS

Haydon Kerk NEWS; date last visited Jan. 13, 2012; 1 page printed from Internet; http://www.haydonkerk.com/News/tabid/231/novusact/viewarticle/Default.aspx?articleid=RGMUPZ00Xgo.

* cited by examiner

US 9,334,937 B2

FLOATING NUT AND CARRIAGE ASSEMBLY

FIELD OF THE INVENTION

The present invention generally relates to linear guides and particularly to linear guides that drive a carriage along a guide rail using a drive screw.

BACKGROUND OF THE INVENTION

Linear guides are used to guide devices along a predetermined linear pathway in a highly accurate and repeatable fashion. Typically, these linear guides will include a guide rail, a carriage that is driven along the guide rail and a device for driving the carriage along the guide rail. In some embodiments, a screw may be the device for driving the carriage along the guide rail.

In highly precise applications, there is very limited, if any, clearance between the guide rail and the carriage and the screws are designed to have very high straightness. However, tolerance stack up between the guide surfaces of the guide rail and carriage as well as the screw in addition to any flexure in the components or variations due to machining can cause binding within the linear guide, as well as high or variable running torque. This variation in forces within the linear guide can affect the positional control of the carriage along the guide rail.

The present invention relates to improvements over the current state of the art in linear guides.

BRIEF SUMMARY OF THE INVENTION

A new and improved linear guide is provided to overcome some of the limitations of prior linear guides. The new and improved linear guide includes a guide rail, a carriage, a drive screw and a connection arrangement. The guide rail defines a linear travel path. The carriage is mounted to the guide rail for motion along the linear travel path. The drive screw is operably mounted to the guide rail. The connection arrangement couples the drive screw to the carriage to convert rotary motion of the drive screw to linear actuation of the carriage along the linear travel path. The connection arrangement provides a single degree of linear freedom between the drive screw and the carriage in a direction that is generally perpendicular to the linear travel path. The single degree of linear freedom permits relative motion between the screw and the carriage to relieve some of the internal binding between the relative components.

In one embodiment, the connection arrangement provides a slot and receiver arrangement that permits the linear degree of freedom.

In another embodiment, the slot and receiver arrangement has cooperating anti-rotation features to prevent relative rotation due to rotational torques presented by the drive screw and particularly backlash when the drive screw changes rotational direction.

In one embodiment, the connection arrangement includes a nut and a cradle arrangement. The nut threadably cooperates with the drive screw. The nut and cradle arrangement have cooperating anti-rotation features to prevent relative rotation therebetween due to rotational torques presented by the drive screw.

In one embodiment, the nut includes a head portion that is received in a slot of the cradle arrangement. The engagement between the head portion and the cradle arrangement prevents rotation between the nut and the cradle arrangement. The engagement between the head portion and the cradle arrangement prevents linear motion therebetween in a direction parallel to the travel path.

In one embodiment, the carriage includes a mounting arrangement for mounting the carriage to the guide rail. The mounting arrangement is configured to prevent linear motion of carriage relative to the guide rail in a plane generally orthogonal to the travel path.

In one embodiment, the mounting arrangement includes first and second channels formed in arm portions of the carriage. Each channel receives a corresponding portion of the guide rail. The channels are bounded by sliding surfaces that slide on corresponding surfaces of the guide rail. Preferably, the sliding surfaces are provided by low friction material.

In one embodiment, the slot defines parallel sides that extend generally perpendicular to the travel path. The head has parallel sides that extend generally perpendicular to the travel path that cooperate with the parallel sides of the slot.

In one embodiment, the connection arrangement includes a first component that defines at least one slot and a second component that mates with the slot. The second component is slidable within the slot along the single degree of linear freedom. In one embodiment, the first component is fixedly part of the carriage and the second component is a nut having a head portion that is received within the slot of the first component.

In one embodiment, the linear guide further includes a pair of end blocks. The end blocks are attached to the guide rail and rotationally support the drive screw.

In one embodiment, cradle arrangement includes a pair of transversely inward facing surfaces that face one another and that bound opposed ends of the slot and extend parallel to the single degree of linear freedom. The head portion of the nut includes a pair of transversely outward facing surfaces that face away from one another and extend parallel to the single degree of linear freedom. The outward facing surfaces slide relative to the inward facing surfaces to provide the single degree of linear freedom. Preferably, the inward and outward facing surfaces are planar.

In one embodiment, a method of reducing binding within a linear guide is provided. The linear guide has a guide rail a guide rail defining a linear travel path; a carriage mounted to the guide rail for motion along the linear travel path; a drive screw operably mounted to the guide rail; and a connection arrangement coupling the drive screw to the carriage to convert rotary motion of the drive screw to linear actuation of the carriage along the linear travel path. The method includes providing a single degree of linear freedom between the drive screw and the carriage in a direction that is generally perpendicular to the linear travel path.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
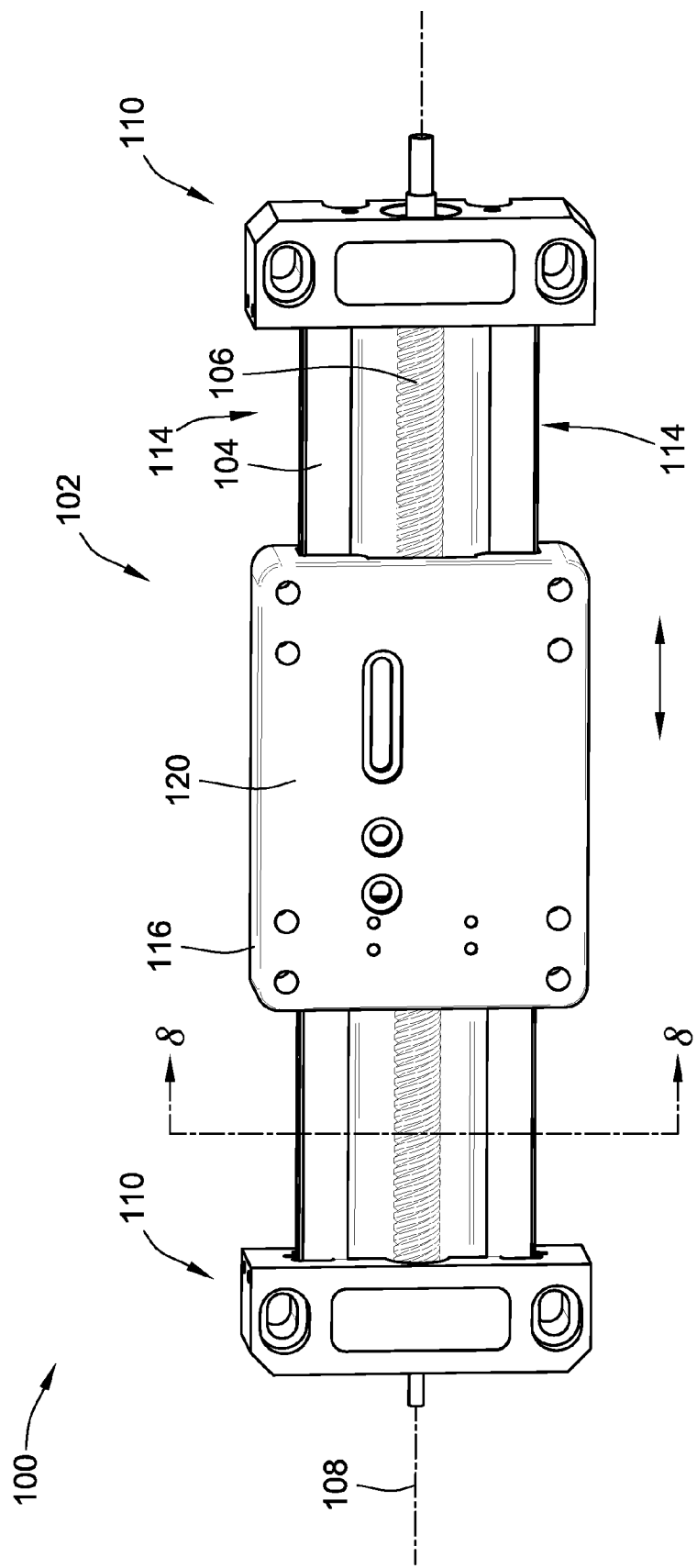
FIG. 1 is a top perspective illustration of a linear guide according to an embodiment of the present invention.
Figure 2:
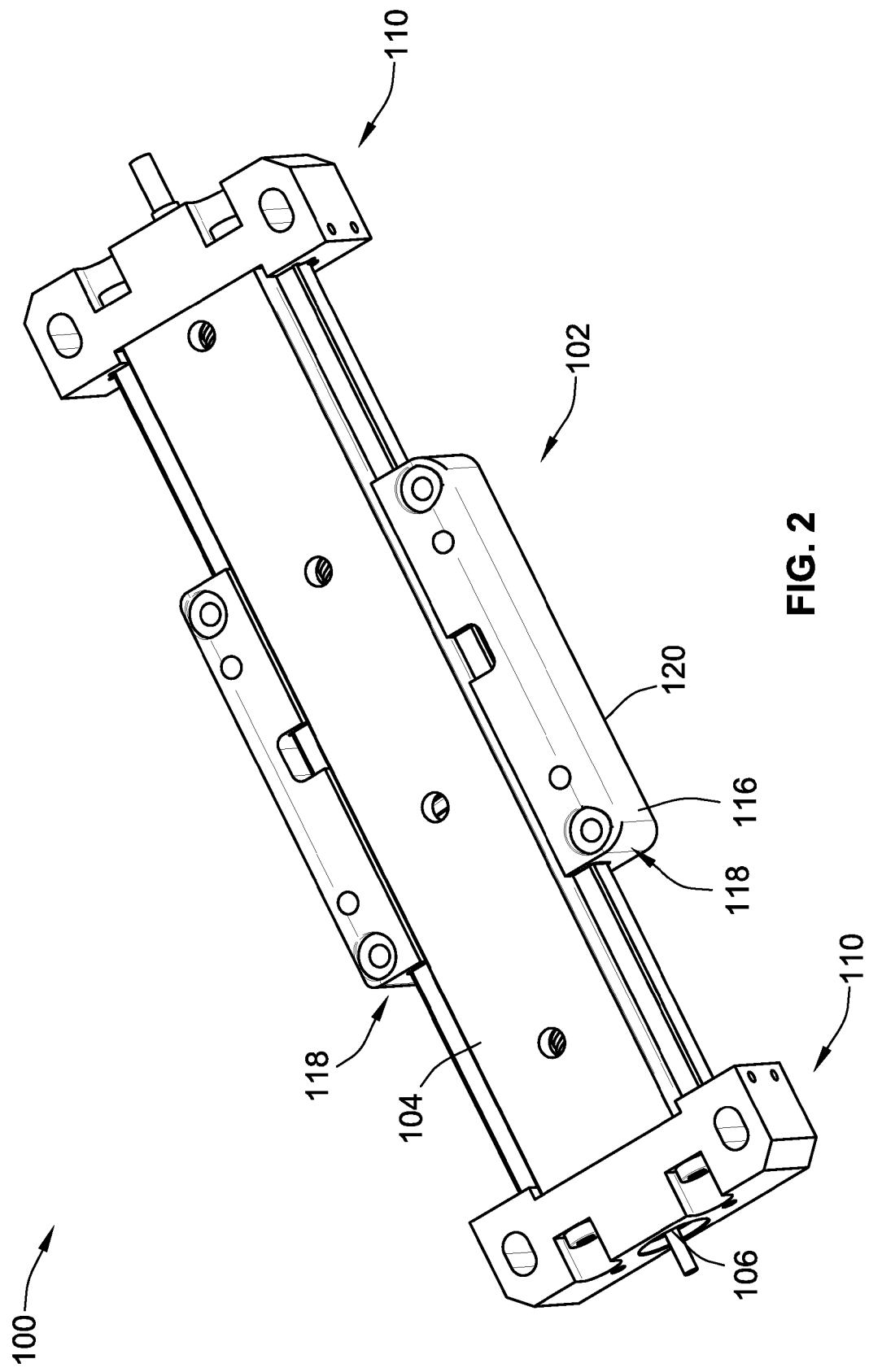
FIG. 2 is a bottom perspective illustration of the linear guide of FIG. 1.

FIGS. 1 and 2 illustrate a linear guide 100 according to an embodiment of the invention. The linear guide is configured to guide an attached device along a predetermined pathway. The linear guide 100 includes a carriage 102 mounted to a guide rail 104 and a drive screw 106 that operably drives the carriage 102 along the guide rail 104. Rotational motion of the drive screw about axis 108 will drive the carriage 102 linearly along the guide rail 104.

The drive screw 106 and guide rail 104 are mounted to end blocks 110 at opposed ends thereof. The end blocks 110 may include bearings or bushings for rotationally supporting the drive screw 106. The ends of the guide rail 104 are inserted into grooves or slots formed in the end blocks 110. Further, screws or other fasteners may be provided to secure the ends of the guide rail 104 into the grooves or slots of the end block 110. The end blocks 110 may include slots or apertures for allowing a user to mount the end blocks 110 to another support surface.

Figure 3:
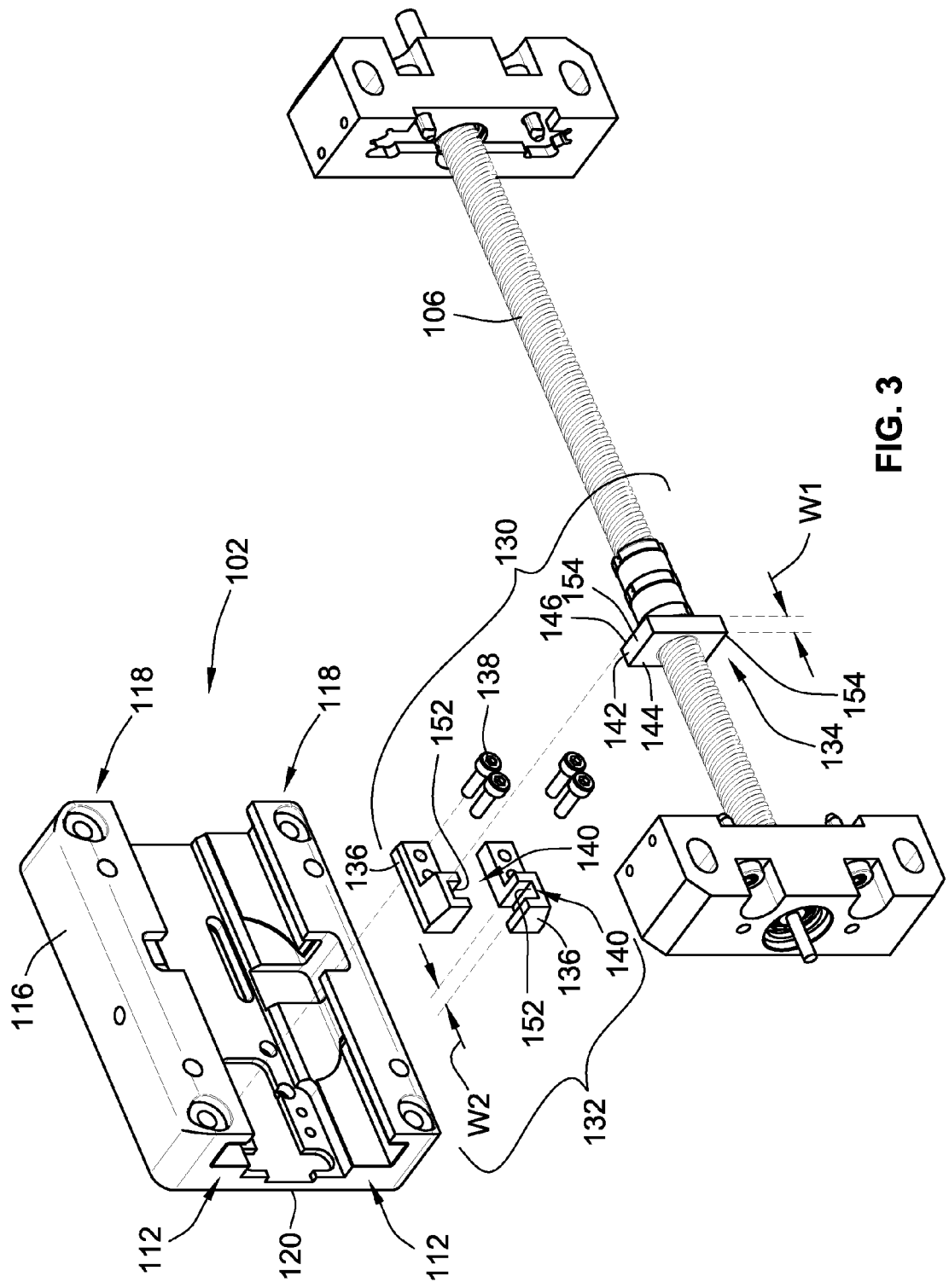
FIG. 3 is a bottom exploded illustration of the linear guide of FIG. 1 with the guide rail removed.
Figure 8:
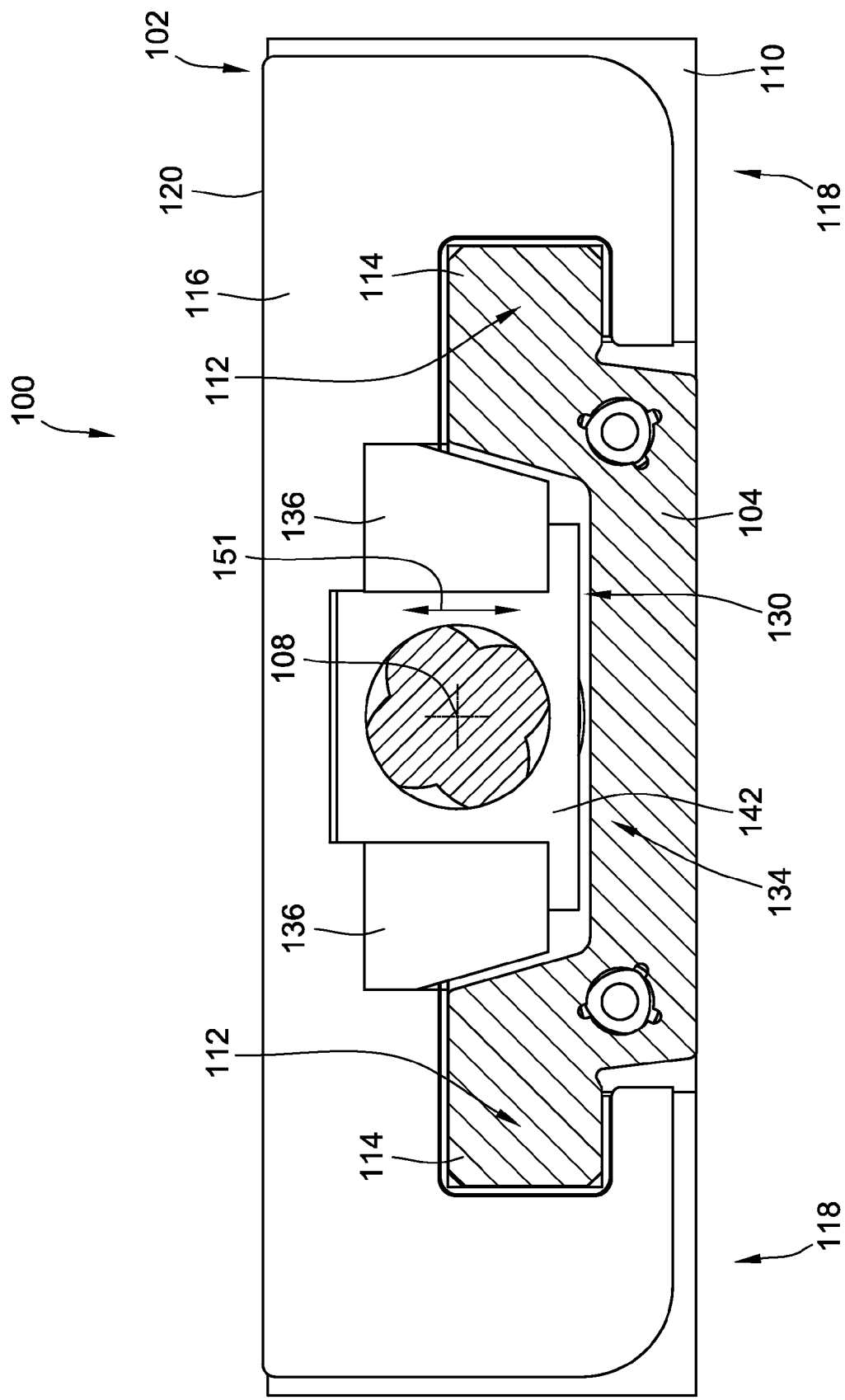
FIG. 8 is a cross-sectional end view of the linear guide of FIG. 1 taken about line 8-8.

With additional reference to FIGS. 3 and 8, the carriage 102 generally defines channels 112 that receive raceway portions 114 of the guide rail 104. The channels 112 are bounded by a low friction material such as a lubricious material that may be in the form of FREELON, which is a polytetrafluoroethylene (PTFE) based material. The channels 112 are generally formed by three sidewalls or surfaces that have two of the sidewalls or surfaces parallel to one another with a third sidewall or surface extending perpendicular therebetween. These three sidewalls or surfaces are generally coated with or provided by the lubricious or self-lubricating material such as PTFE. This self-lubricating material can be adhered or otherwise secured to the body of the carriage 102. The three sidewalls or surfaces defining each of the channels 112 cooperate with a corresponding one of three sides of the raceway portions 114. There is a close tolerance relationship between the channels 112 and the raceway portions 114 in order to prevent play therebetween and to provide accurate motion for the carriage 102 along the axis 108 and guiderail 104 when driven by drive screw 106 in reciprocating motion along the guiderail 104.

The carriage 102 generally includes a body 116 with a pair of arms 118 extending away from a top surface 120. The top surface 120 is configured for mounting additional structures that are to be driven linearly along axis 108. The guiderail 104 is positioned transversely between the arm portions 118 as is the drive siren 106 when assembled.

The sides of the raceway portions 114 that cooperate with the channels 112 of the arms 118 of the carriage 102 have very high tolerance characteristics such that they are very straight and smooth. This promotes improved accuracy of the travel of the carriage 102 therealong.

Figure 4:
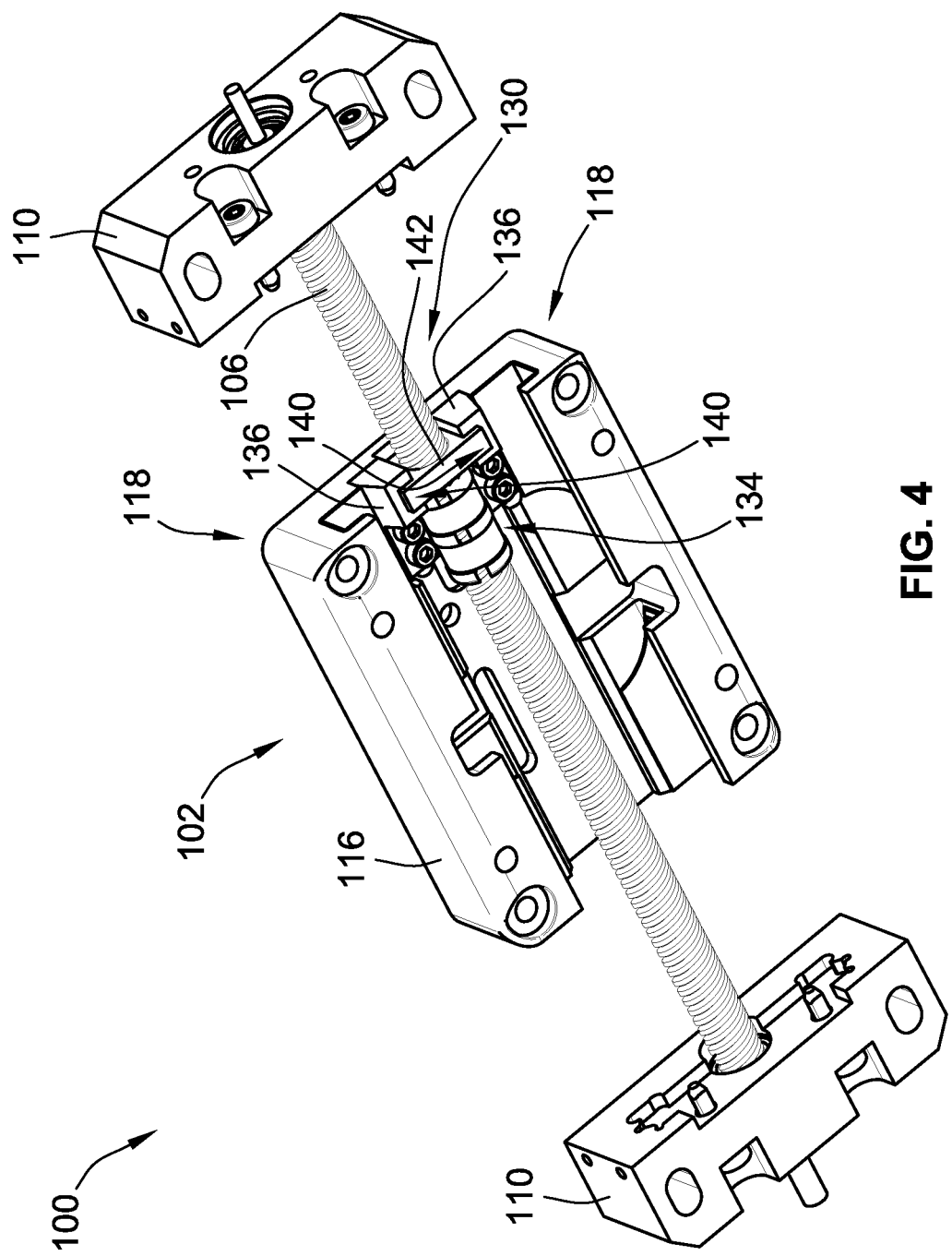
FIG. 4 is a bottom perspective illustration of the linear guide of FIG. 1 with the guide rail removed.

FIG. 3 illustrates the linear guide 100 from the bottom in exploded form with the guiderail 104 removed. FIG. 4 illustrates the linear guide 100 with the guide rail 104 removed and viewed from a bottom thereof. The linear guide 100 includes a connection arrangement 130 for operably connecting the drive screw 106 to the carriage 102 to convert rotary motion of the drive screw 106 into linear motion of the carriage 102.

Figure 5:
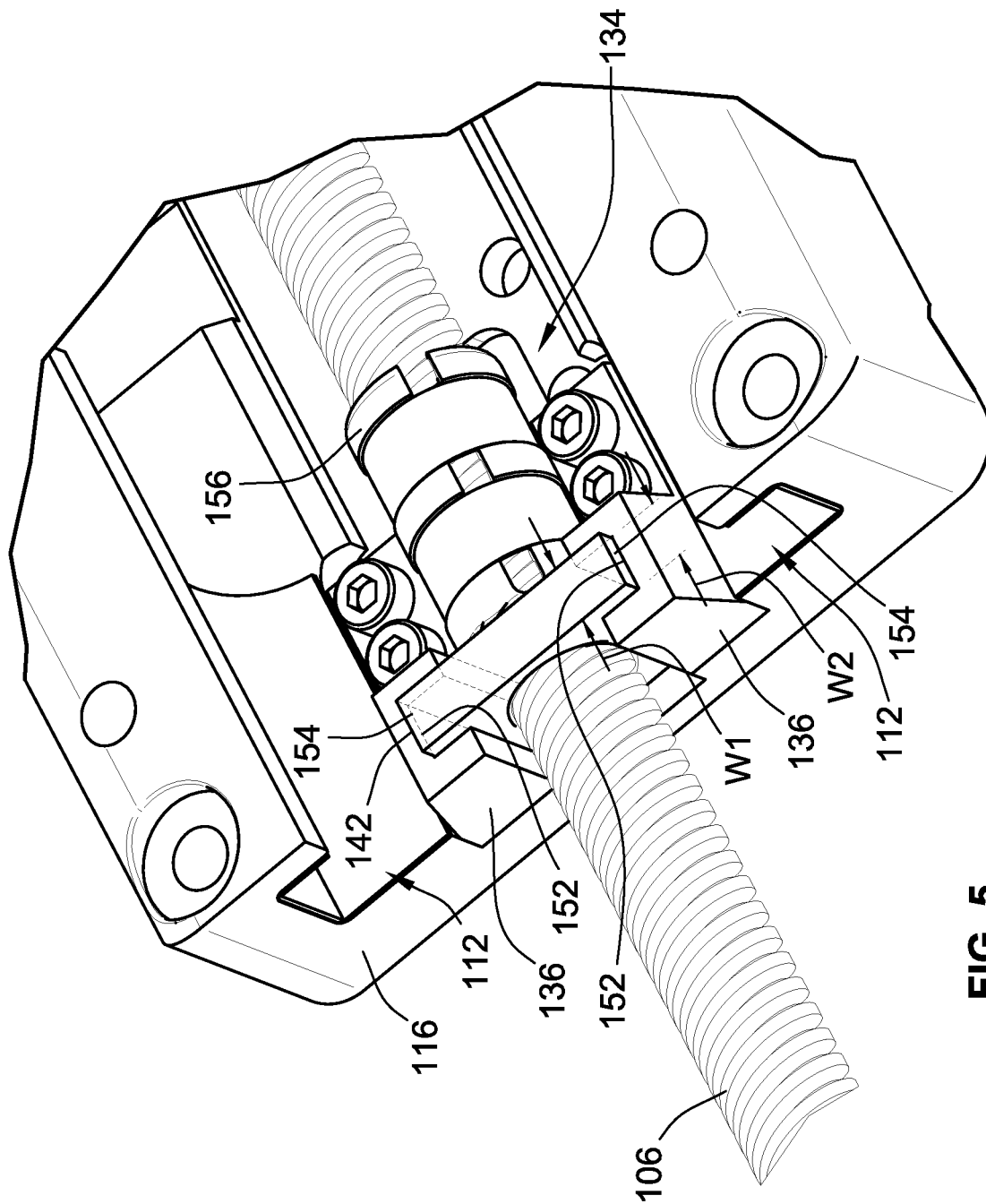
FIG. 5 is an enlarged illustration of the connection arrangement between the carriage and drive screw of the linear guide of FIG. 1.
Figure 6:
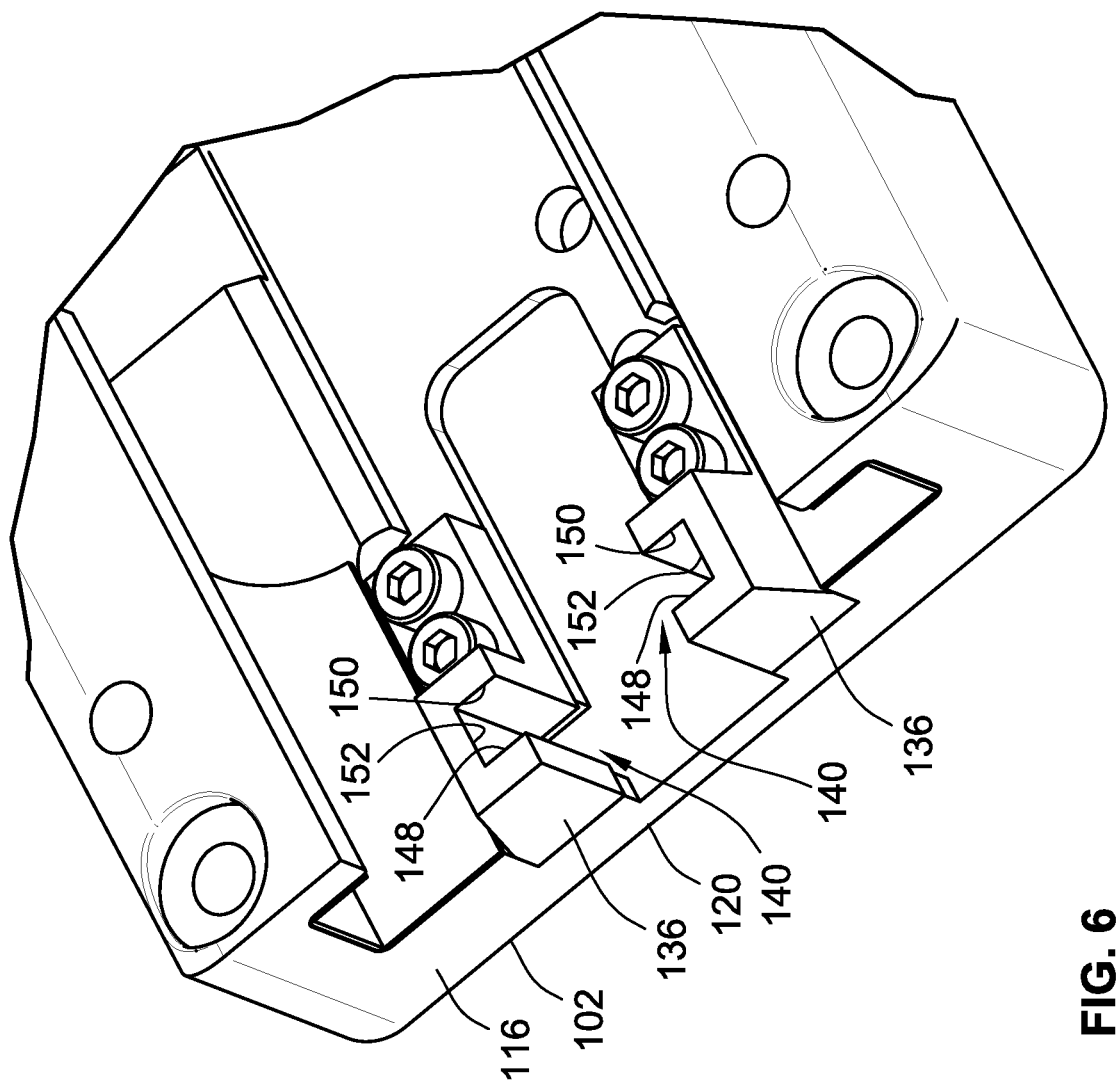
FIG. 6 is an enlarged illustration of the bottom side of the carriage of the linear guide of FIG. 1 showing the portion of the connection arrangement that is part of the carriage.
Figure 7:
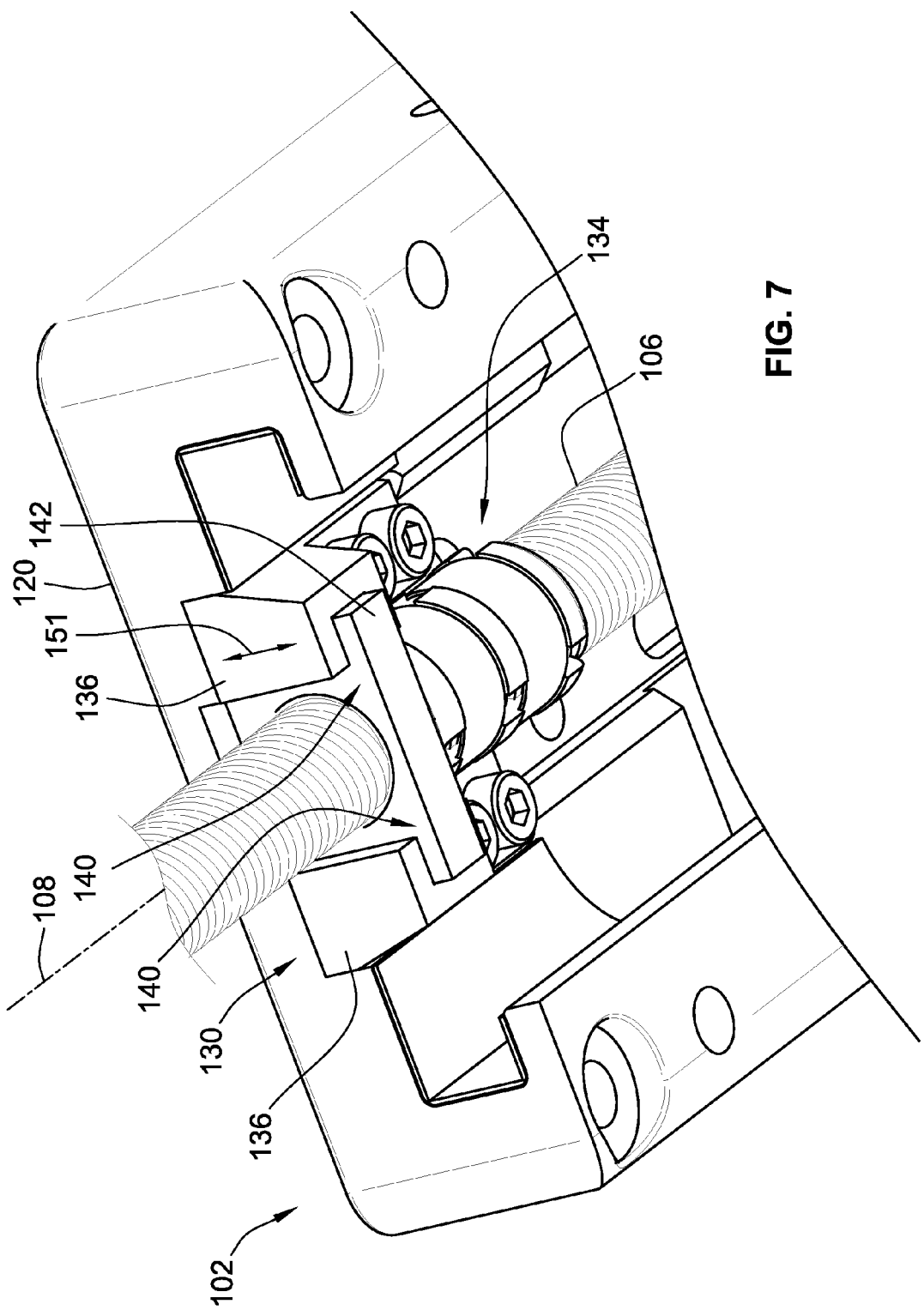
FIG. 7 is an enlarged illustration of the bottom side of the carriage showing the connection arrangement of the linear guide of FIG. 1.

With additional reference to FIGS. 5-7, the connection arrangement 130 generally includes a cradle mechanism 132 that slideably cooperates with a lead screw nut 134. The cradle mechanism 132 is formed as part of carriage body 116 or otherwise attached to the carriage body 116. In the instant embodiment, the cradle mechanism 132 is provided by a pair of attachment brackets 136 that are operably mounted to an underside of the carriage body 116. The attachment brackets 136 are attached by screws 138 that are threaded into the underside of the body 116. The attachment brackets 136 define grooves 140 that are in opposed and spaced relation such that the openings or mouths thereof face one another to form a receiving slot thereby.

The lead screw nut 134 includes a head portion 142 that is configured to be received in the grooves 140 of the attachment brackets 136. The axial width w1 of the head portion 142 is substantially equal to the axial width w2 of the grooves 140 when measured parallel to the axis 108 of the drive screw 106. As such, there is substantially no axial clearance or play between the opposed axial end faces 144, 146 of the head portion 142 and the opposed facing surfaces on each of the attachment brackets 136.

Each of the grooves 140 is bound, in part, by a transversely facing surface 152. These transversely facing surfaces 152 face one another when mounted to the carriage body 116. Preferably, these transversely facing surfaces 152 are generally planar surfaces that extend generally perpendicular to the axes 108 of the drive screw 106.

The head portion 142 of the nut 134 has corresponding transversely facing surfaces 154 that face transversely away from one another. These transversely facing surfaces 154 cooperate with and abut against corresponding ones of the transversely facing surfaces 152 of the attachment brackets 136 that face one another when the head portion 142 is operably received in grooves 140. The transversely facing surfaces 154 of the head portion 142 are also generally planar and will extend perpendicularly to the top surface 120 of the carriage like transversely facing surfaces 152.

Preferably, the head portion is sized such that it can slide axially within the grooves 140 in a direction generally perpendicular to the length of the drive screw 106, as well as perpendicular to top surface 120. More particularly, the nut 134 is permitted to move in an axial direction, illustrated by arrow 151 in FIG. 7, that is generally perpendicular to a plane defined by the top or bottom surfaces of the guide rail 104.

This arrangement allows for any tolerance stack up or variation between the guide rail 104 and the drive screw 106. As used herein, a single linear degree of freedom shall not include the rotational degree of freedom between the screw and nut. More particularly, if there are variations in the straightness of either the drive screw or the guide rail, the first degree of freedom provided by the sliding arrangement between the head portion 142 of nut 134 and the grooves 140 of the attachment brackets 136 allows for some relief of any friction or forces that are applied between the drive screw and the carriage due to binding in the connection between the two components. More particularly, the head portion 142 is permitted to slide within the grooves 140 of the attachment brackets 136. This can also compensate for slight tolerance variation in the components of the linear guide 100.

The connection arrangement 130 also provides anti-rotation features/structures. The transversely facing surfaces 152, 154 cooperate with one another to prevent rotation of the nut 134 within the grooves 140 in an angular direction about axis 108 of the drive screw 106. This prevents any torsional backlash between the drive screw 106 and the carriage 102, particularly when the drive screw 106 changes rotational direction about axis 108 to change the linear direction of movement of the carriage 102 along the guide rail 104. This maintains the accuracy of the position of the carriage 102 along the axis 108, particularly when changing axial direction of movement.

Again, this sliding interface between the head portion 142 and the attachment brackets 136 helps reduce binding between the drive screw 106 and the connection arrangement 130, and particularly the lead screw nut 134 thereof during operation of the linear guide 100.

The nut 134 preferably includes a plurality of flexible fingers 156 having threads formed from a low friction or self-lubricating material such as PTFE to reduce friction between the nut 134 and the drive screw 106. The flexible fingers 156 may be integrally formed with the head portion 142 into a single piece of material, such as being molded as a single component. Alternatively, the flexible fingers 156 could be formed from a separate component as the head portion 142.

While the illustrated embodiment includes a head portion 142 formed or provided by the nut 134 and grooves provided by the brackets 136 (or the carriage 102 generally), an alternative embodiment could have these features reversed. More particularly, the nut could provide one or more grooves that receive one or more posts or wall portions of the carriage 102 that slide within the grooves formed by the head portion that provides a single linear degree of freedom.

The use of separate attachment brackets 136 allows for an adjustment of the mounting of the grooves 140 to the rest of the carriage 102.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A linear guide comprising:
   a guide rail defining a linear travel path;
   a carriage mounted to the guide rail for motion along the linear travel path;
   a drive screw operably mounted to the guide rail; and
   a connection arrangement coupling the drive screw to the carriage to convert rotary motion of the drive screw in a first rotational direction to linear actuation of the carriage along the linear travel path in a first linear direction and to convert rotary motion of the drive screw in a second rotational direction opposite the first rotational direction to linear actuation of the carriage along the linear travel path in a second linear direction opposite the first linear direction, the connection arrangement providing a single degree of linear freedom between the drive screw and the carriage in a direction that is generally perpendicular to the linear travel path.

2. The linear guide of claim 1, wherein the connection arrangement provides a slot and receiver arrangement that permits the linear degree of freedom.

3. The linear guide of claim 2, wherein the slot and receiver arrangement having cooperating anti-rotation features to prevent relative rotation due to rotational torques presented by the drive screw.

4. The linear guide of claim 1, wherein the connection arrangement includes a nut and a cradle arrangement, the nut threadably cooperates with the drive screw, the nut and cradle arrangement having cooperating anti-rotation features to prevent relative rotation therebetween due to rotational torques presented by the drive screw.

5. The linear guide of claim 1, wherein the connection arrangement includes a nut and a cradle arrangement, the nut including a head portion that is received in a slot of the cradle arrangement, engagement between the head portion and the cradle arrangement preventing rotation between the nut and the cradle arrangement, engagement between the head portion and the cradle arrangement preventing linear motion therebetween in a direction parallel to the travel path.

6. The linear guide of claim 1, wherein the carriage includes a mounting arrangement for mounting the carriage to the guide rail, the mounting arrangement configured to prevent linear motion of carriage relative to the guide rail in a plane generally orthogonal to the travel path.

7. The linear guide of claim 6, wherein the mounting arrangement includes first and second channels formed in arm portions of the carriage, each channel receiving a corresponding portion of the guide rail, the channels being bounded by sliding surfaces that slide on corresponding surfaces of the guide rail.

8. The linear guide of claim 7, wherein the sliding surfaces are provided by low friction material.

9. The linear guide of claim 5, wherein the slot defines parallel sides that extend generally perpendicular to the travel path and the head has parallel sides that extend generally perpendicular to the travel path that cooperate with the parallel sides of the slot.

10. The linear guide of claim 1, wherein the connection arrangement includes a first component that defines at least one slot and a second component that mates with the slot, the second component slidable within the slot along the single degree of linear freedom.

11. The linear guide of claim 10, wherein the first component is fixedly part of the carriage and the second component is a nut having a head portion that is received within the slot of the first component.

12. The linear guide of claim 1, further comprising a pair of end blocks, the end blocks attached to the guide rail and rotationally supporting the drive screw.

13. The linear guide of claim 5, wherein the cradle arrangement includes a pair of transversely inward facing surfaces that face one another and that bound opposed ends of the slot and extend parallel to the single degree of linear freedom, the head portion includes a pair of transversely outward facing surfaces that face away from one another and extend parallel to the single degree of linear freedom.

14. The linear guide of claim 13, wherein the outward facing surfaces slide relative to the inward facing surfaces to provide the single degree of linear freedom.

15. The linear guide of claim 13, wherein the inward and outward facing surfaces are planar.

16. The linear guide of claim 1, wherein the single degree of linear freedom is not a degree of freedom that permits the carriage to move linearly along the travel path.

17. The linear guide of claim 4, wherein the single degree of linear freedom is not a degree of freedom between the nut and the drive screw.

18. A method of reducing binding within a linear guide having a guide rail defining a linear travel path; a carriage mounted to the guide rail for motion along the linear travel path; a drive screw operably mounted to the guide rail; and a connection arrangement coupling the drive screw to the carriage to convert rotary motion of the drive screw to linear actuation of the carriage along the linear travel path, the method comprising:

providing with the connection arrangement coupling the drive screw to the carriage a single degree of linear freedom between the drive screw and the carriage in a direction that is generally perpendicular to the linear travel path wherein the connection arrangement convert rotary motion of the drive screw in a first rotational direction to linear actuation of the carriage along the linear travel path in a first linear direction and converts rotary motion of the drive screw in a second rotational direction opposite the first rotational direction to linear actuation of the carriage along the linear travel path in a second linear direction opposite the first linear direction.

* * * * *

UNITED STATES PATENT AND TRADEMARK OFFICE
CERTIFICATE OF CORRECTION

| | | |
|---|---|---|
| PATENT NO. | : 9,334,937 B2 | Page 1 of 1 |
| APPLICATION NO. | : 13/934423 | |
| DATED | : May 10, 2016 | |
| INVENTOR(S) | : Robert Schroeder et al. | |

It is certified that error appears in the above-identified patent and that said Letters Patent is hereby corrected as shown below:

In the claims,

In Claim 18:

At column 8, line 17, insert a --,-- after "providing"

At column 8, line 18, insert a --,-- after "carriage"

At column 8, line 21, insert a --;-- after "path"

At column 8, line 21, the word "convert" should be --converts--

Signed and Sealed this
Nineteenth Day of July, 2016

Michelle K. Lee
*Director of the United States Patent and Trademark Office*